US010357128B2

(12) United States Patent
Clark et al.

(10) Patent No.: US 10,357,128 B2
(45) Date of Patent: Jul. 23, 2019

(54) CONTROLLABLE BREWER

(71) Applicant: BUNN-O-MATIC CORPORATION, Springfield, IL (US)

(72) Inventors: Charles H. Clark, Springfield, IL (US); Ming Lung Huang, Springfield, IL (US); Frederick Phillip Cable, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 15/520,802

(22) PCT Filed: Oct. 21, 2015

(86) PCT No.: PCT/US2015/056740
§ 371 (c)(1),
(2) Date: Apr. 20, 2017

(87) PCT Pub. No.: WO2016/065054
PCT Pub. Date: Apr. 28, 2016

(65) Prior Publication Data
US 2018/0000282 A1  Jan. 4, 2018

Related U.S. Application Data

(60) Provisional application No. 62/118,191, filed on Feb. 19, 2015, provisional application No. 62/066,887, filed on Oct. 21, 2014.

(51) Int. Cl.
*A47J 31/54* (2006.01)
*A47J 31/34* (2006.01)
(Continued)

(52) U.S. Cl.
CPC .......... *A47J 31/54* (2013.01); *A47J 31/0652* (2013.01); *A47J 31/4403* (2013.01); *A47J 31/46* (2013.01); *A47J 31/465* (2013.01)

(58) Field of Classification Search
CPC .......... A47J 31/465; A47J 31/56; A47J 31/46; A47J 31/002; A47J 31/057; A47J 31/36;
(Continued)

(56) References Cited

U.S. PATENT DOCUMENTS 3,520,247 A  7/1970  Hester
8,037,811 B2 * 10/2011 Bunn .................. A47J 31/46
99/280

(Continued)

OTHER PUBLICATIONS

Search Report and Written Opinion issued in Int'l App. No. PCT/US2015/056740(2015).

*Primary Examiner* — Hong T Yoo
(74) *Attorney, Agent, or Firm* — Barnes & Thornburg LLP

(57) ABSTRACT

The present disclosure includes a beverage making device including a heated water tank and a reservoir for controllably dispensing water over a beverage making substance to create a beverage. The beverage making device includes a vent valve coupled to the reservoir and heated water tank, a pump coupled to the reservoir for moving water from the reservoir to the heated water tank, a flow meter associated with the heated water tank for determining the water dispensed into the heated water tank, a spray head coupled to the heated water tank for distributing water over a beverage making substance. A controller coupled to the relevant portions of the system for controllably operating the system.

4 Claims, 2 Drawing Sheets

(51) Int. Cl.
  *A47J 31/46* (2006.01)
  *A47J 31/44* (2006.01)
  *A47J 31/06* (2006.01)

(58) Field of Classification Search
  CPC .... A47J 31/545; A47J 31/0573; A47J 31/106;
        A47J 31/0663; A47J 31/0673; A47J
        31/32; A47J 31/54; A47J 31/34; A47J
        31/446
  USPC .......... 426/433; 99/279, 275, 282, 305, 300,
        99/306, 323.3, 281, 299
  See application file for complete search history.

(56) References Cited

U.S. PATENT DOCUMENTS

| | | | |
|---|---|---|---|
| 2004/0194631 A1* | 10/2004 | Pope | A47J 31/4475 |
| | | | 99/279 |
| 2005/0011364 A1 | 1/2005 | Chen et al. | |
| 2005/0236431 A1 | 10/2005 | Rahn | |
| 2007/0157820 A1 | 7/2007 | Bunn | |
| 2013/0004629 A1* | 1/2013 | Clark | A47J 31/4467 |
| | | | 426/231 |

\* cited by examiner

CONTROLLABLE BREWER

CROSS REFERENCE TO RELATED APPLICATIONS

This application is a U.S. nationalization under 35 U.S.C. § 371 of International Application No. PCT/US2015/056740, filed Oct. 21, 2015, which claims the benefit of priority under 35 U.S.C. § 119(e) to U.S. Provisional Patent Application Nos. 62/066,887, Filed Oct. 21, 2014, and 62/118,191, filed Feb. 19, 2015. The disclosures set forth in the referenced applications are incorporated herein by reference in their entireties.

BACKGROUND

The present disclosure includes a variety of brewers that have been developed which are used to produce coffee, tea and other beverages by combining heated water with a beverage making substance such as coffee, tea or other materials to produce a brewed beverage. A variety of beverage brewing systems have been produced which have a substance holding container such as a funnel in which beverage brewing substance is deposited. Heated water is then dispensed over the beverage brewing substance and funnel to produce a beverage which is then drained from the funnel. The drained beverage is collected in a container such as a cup or carafe for subsequent enjoyment.

One of the issues that arise with regard to any beverage making devices is that they do not accommodate a range of volumes of beverage. In other words, while some beverage making devices are optimized to produce a large carafe full of brewed beverage others are optimized to produce a single cup. As such, it would be useful to provide a beverage making device which can brew a broad range of volumes. Also, it would be useful to produce a beverage making device which can detect the cessation of draining of beverage from the funnel either to provide a control signal allowing unlocking of a funnel from the device or to signal a user that the carafe or funnel may be removed since the beverage has drained from the funnel.

It would also be useful to provide a beverage making device which can be used to agitate or mix the combination of beverage making substance and water during the beverage making process. Additionally, it would be useful to provide a beverage making device which can be used to alter, address or otherwise control the concentration, strength or other characteristics of the brewed beverage by control of the dispensing of water from the device into the funnel.

This background information is provided to provide some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

Figure 1:
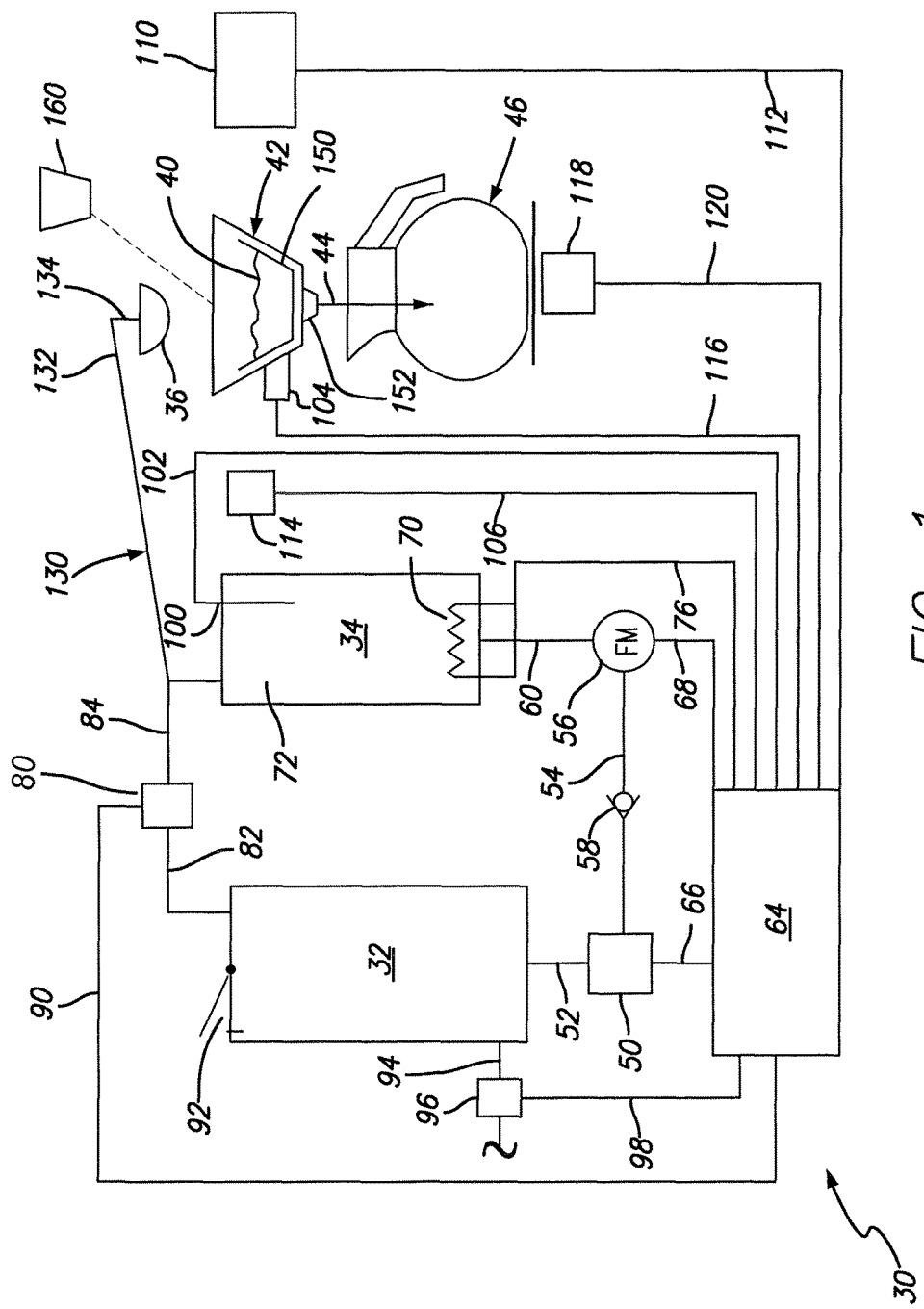
FIG. 1 is a diagrammatic view of a system for producing beverages, the system includes a heated water tank, a reservoir coupled to and communicating with the heated water tank, a vent valve communicating with both the reservoir and the heated water tank, a pump communicating with the reservoir and indirectly the heated water tank to move water from the reservoir to the tank, a flow meter for detecting the flow of water from the reservoir to the tank coupled and communicating with the pump and the heated water tank, a spray head coupled to the heated water tank to controllably dispense by operation of the pump and vent valve, water over a brewing substance retained for making beverage, and a controller coupled to the relevant components of the system to control the operation of the system.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Beverage ingredients will be described in the present application and will be generally referred to as "coffee". However, it should be understood that the term beverage ingredient should be broadly interpreted regardless of reference to beverage ingredient or coffee. Also, the characteristics or form of the beverage ingredient can be any variety of ingredients which are currently known or hereafter developed. The form of the beverage ingredient may include powder, liquid, gel, crystal, flake, freeze-dried and any other form or state regardless of temperature, phase or other characteristics. Reference to beverage dispensing includes reconstituting, brewing, steeping or any other form of combining a dilution ingredient with a beverage ingredient.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience throughout the application it should be understood that any variety of dilution ingredients could be used with the present application.

While the formats of the beverage ingredient containers are generally described as a "pod" and "cartridge" any variety of additional formats could be employed. Furthermore, while a pod or cartridge of ordinary configuration and dimension is described, any variety of sizes could be used. In this regard, the beverage dispenser could dispense a large quantity of beverage or individual single serving cups. The reference to the beverage ingredient container should be broadly interpreted and should not be limited.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

As shown in FIG. 1, the beverage making system 30 includes a water reservoir 32, a heated water tank 34 and a spray head 36. Water is retained in the reservoir 32 and then moved from the reservoir to the heated water tank 34 on demand. Ultimately, water is dispensed through the spray head over beverage making substance 40 retained in a funnel 42. The saturated beverage making substance 40 then produces a beverage 44 which is dispensed into a carafe 46. It should be noted that the carafe 46 could also be a much smaller volume container such as a single served cup. In this regard, as will be explained in greater detail herein, the volume of water moved from the reservoir 32 to the heated water tank 34 and out through the spray head 36 can be controlled to produce larger or smaller volumes of brewed beverage as well as to control the level of extraction of the beverage.

The system 30 includes a pump 50 which communicates with the reservoir 32 via line 52. Water is moved by the pump 50 from the reservoir 32 to the heated water tank 34. Line 54 connects the pump to a flow meter 56 with a check valve 58 positioned in line 54. Flow meter 56 is coupled to the heated water reservoir via line 60. The pump and flow meter are both coupled to a controller 64 via lines 66, 68, respectively. A heater 70 is associated with the heated water tank 34 either in the tank or in relative proximity to the tank to transfer energy to water 72 retained in the tank 34. The heater 70 is coupled to the controller via line 76.

A controllable vent valve 80 is coupled to and communicates with the reservoir 32 via line 82 and the heated water tank 34 via line 84. The vent valve 80 is coupled to the controller 64 via line 90. Water can be introduced to the reservoir 32 either through a pour in opening 92 or a controllable inlet water line 94. The controllable inlet water line includes a controllable solenoid valve 96 which is coupled to the controller 64 via line 98. A temperature sensor 100 is associated with the heated water tank 34 to detect the temperature of the water 72 to facilitate control heating of the water. The temperature sensor 100 is coupled to the controller 64 via line 102.

In one embodiment of the system 30 an indicator, warning, LCD or other system 114 is provided and coupled to the controller 64 via line 106. These components such as a "brew done indicator", "warning indicator" or multiple warning indicators, as well as an LCD display can be integrated into a single device or maybe separate devices. Additionally, a user interface 110 can be provided which can be used to control the volume of beverage dispense, strength or extraction control, pulsing or volumetric water dispensing routines, brew start control, cleaning cycle control, as well as control for accommodating decaffeinated brewing substance or soft water. The user interface 110 is coupled to the controller 64 via line 112.

Additionally, the present system 30 can be configured to include a load cell 114 coupled or otherwise associated with the funnel 42 to detect various characteristics associated with the funnel. The load cell 114 is coupled to the controller 64 via line 116. Alternatively, or additionally, a load cell 118 can be associated with the server 46 either at a warming station or an unheated station where the server 46 is positioned. The load cell 118 is coupled to the controller 64 via line 120.

The present system 30 produces beverage by introducing water to the reservoir 32 either through the opening 92 or the controllable inlet line 94. Generally, if the opening 92 is provided on an embodiment of the system 30 it should include a seal to facilitate controlled dispensing of water from the reservoir using the pump 50. If the controllable inlet line 94 is used the solenoid valve 96 is operated by the controller 64 to allow water to flow into the reservoir. Alternatively, the solenoid valve 96 can be eliminated and the pump 50 will be the means to regulate flow from the line 94 into the reservoir 32. Once the user has used the interface 110 to activate a brewing cycle, water is moved from the reservoir using the pump 50 through line 54. The check valve 58 prevents back flow of water which has been moved by the pump 50 towards the heated water reservoir. The flow meter 56 is used to detect the flow of water to the heated water reservoir 34. Signal detection is sent to the controller 64 over line 68. The water 72 and the heated water reservoir 34 are maintained in a predetermined temperature or within a range of temperatures using the temperature sensor 100 to provide feedback over line 102 to the controller 64. As needed based on the controller's heating control algorithm the heater 70 is activated or deactivated to add or stop adding energy to the water 72.

During a brewing cycle the control valve 80 is initially closed so that when the pump 50 is operated movement of water into the heated water reservoir 34 results in movement of water upwardly, using the hottest water first, through a dispensing line 130 towards the spray head 36. After the predetermined volume of water is dispensed over the brewing substance 40 the pump 50 will cease operation thereby preventing the further flow of water from the reservoir 34. At the end of a brew cycle, water in dispense line 130 is permitted to drain back to the reservoir via the control valve 80 which is operated to open the path through lines 84, 82 back to the reservoir 32. As noted, in dispense line 130 includes an upwardly sloped section 132 sloped upwardly towards the spray head 36. A generally vertical section 134 of the dispense line 130 can be provided at the spray head to also provide self-draining of the line 130 at the end of a brewing cycle. The ability to self-drain can be useful to prevent the accumulation of lime in the dispense line 130 which might otherwise be deposited as a result of heated water sitting in the dispense line. The ability to self-drain provides a beneficial function to drain the dispense line 130 without having to use an air pump to purge water from the line at the end of a brewing cycle.

The heated water tank 34 can be sized to accommodate a smaller tank to produce a relatively large volume of heated water for brewing. In this regard, in hypothetical situation the heated water tank 34 could have a volume of approximately 30 ounces. The reservoir 56 could have a volume of 50-60 ounces. The use of two tanks allows better control of the water supply and allows controlled dispensing of water to effectively deliver approximately 50 ounces of brew water at temperature using the 30 ounce tank. This multiplication of the tank efficiency is achieved by using a control routine in the controller 64 which pulses the water flow on and off using the pump 50 to controllably deliver volumes of water during the brewing cycle. This is in contrast to delivering the entire brew volume during the brew cycle in one continuous flow of water from the heated water tank 34 to the funnel 42.

In other words, a predetermined or programmed pulsing routine can deliver smaller portions of water from the reservoir 32 to the heated water tank 34 displacing the hottest water from the top of the tank out through the dispense line 130. The pulsing is achieved by control of the pump 50 to energize and deenergize the pump or to energize it at variable levels/voltages to manage the flow rate. When the pump is energized water will be pushed through the system and flow out through the spray head 36. When the pump is deenergized the flow will be ceased thereby slowing and ultimately curtailing the flow. This effectively results in smaller controlled doses of water flowing through the heated water reservoir. This allows time for the dose being added at the lower portion of the reservoir near the heating element 70 to be heated. This incremental heating of the smaller doses increases the efficiency and output of the 30 ounce heated water tank 34.

Additionally, the sensor 100 can be placed at an optimal position in the tank and combined with control of the heating element 70 can optimize the heating and energy efficiency of the system. The use of a small heated water tank 34 can reduce the overall size and, possibly height of the beverage maker. In this configuration using a positively pressurized system the dispense line 130 can be positioned as needed since the system does not rely on a siphoned control to promote the dispensing of water through the dispense line 130. It should be noted that other reasons exist for pulsing or varying the water flow to the spray head including changing the flavor profile of the coffee produced and extraction of the beverage.

Another aspect of the system 30 is the use of a wave action. The wave action can be created by varying the DC voltage to the pump 50. Increased voltage to the pump 50 increases the flow of water to the heated water reservoir and increases the pressure through the dispense line 130. This tends to cause an outward enlarged cone of water being dispensed from the spray head 36 when pressurized. When pressure is reduced or relieved the cone of water being dispensed from the spray head 36 tends to contract radially inwardly reducing the spray pattern. The alternating expansion and contraction of the cones pattern or spray path within the funnel 42 creates the wave action. This wave action can be beneficial to cause or enhance movement of the water interacting with the brewing substance 40 in the funnel 42. The movement, agitation or turbulence of the combined water and brewing substance 40 can be used to enhance or control extraction parameters controlling the resulting beverage characteristics. For example, it is possible that increasing the wave action and agitation of the combined brewing substance and water in the funnel could result in higher extraction levels of soluble materials from the brewing substance. The circulating particles of brewing substance 40 within the funnel 42 contacts a larger volume of water possibly increasing the opportunity to transfer substances, particulate matter, oils and other flavoring characteristics from the particles. As water is introduced to the funnel 42 it does not have any of the brewing components extracted from the brewing substance. As it interacts it might be beneficial to distribute this unsaturated water throughout the funnel 42 to enhance the ability to take up the various flavor components in the brewing substance 40. It should be noted that the funnel is envisioned as being one of typical design in which a filter material such as paper or a permanent reusable filter 150 is positioned in the funnel to retain the brewing substance. The filter is a porous material which allows brewed beverage to flow through the wall of the filter 150 and drain through an opening 152 in the funnel under the influence of gravity.

The wave action described provides an additional feature that is advantageous to beverage making. The water trajectory produced by the spray head can be controlled by the pressure of the water delivered to and exiting the spray head. At certain higher controllable voltages, the pressure at the spray head 36 will be such that the spray head water trajectory will be nearly in a horizontal plane. With the proper configuration of the funnel 42 this trajectory can be controlled and used to allow for the water from the spray head to pass over the top of the filter 150 and bypass the beverage substance 40 in the funnel, and instead collect in the lower portion of the funnel without producing beverage and providing bypass water which mixes with the brewed beverage draining through the beverage substance 40 and filter. When water is directed around the substance 40 it is typically called bypass water, and this is an effective means of changing and controlling the flavor profile and extraction levels of the finished beverage in desirable ways.

As previously introduced, the control of the heating element 70 can be controlled by the controller 64 and monitored by the temperature sensor 100. By using a smaller tank of water, less heating may be required. By intermittently activating and deactivating the heating element 70 less energy can be added to achieve the desired temperature consistency throughout the tank. By preventing unnecessary heating, the boiling or enhanced convection flow can be reduced. This results in the hottest water being positioned towards the top of the tank without being drawn down or mixed by more active convection occurrence which might result from added heating. Prior art heating arrangements might have activated the heater for an extended period of time when water is added to the tank under the theory that adding more energy is beneficial to rapidly heat the volume in the tank. However, it has been discovered that such heating can create turbulence and result in mixing of the water in the tank. By more nuanced and controlled heating turbulence and thermal mixing can be reduced allowing the hottest water to rise within the tank and be dispensed through the dispensed line 130. This enhanced control or strategic management of the heater 70 energizing can also enhance the wave action.

It has been learned that activation of the heater can affect the formation of the spray pattern. It is possible that the additional turbulence created by the prior art heating systems reduced the flow through the tank, and create air bubbles in the flow. In other words, controlled heating of the water as described herein creates a more consistent and undisrupted flow from the tank through the dispense line 130. This then results in better control and better formation of the spray pattern from the spray head 36 to the funnel 42. The strategic management of the heating control helps to maintain temperature stratification within the tank thereby optimizing the amount or the proportion of the tank that can be used for brewing at a predetermined acceptable temperature. This allows for more continuous back to back brews and larger consistent volumes of brews throughout a series of brewing cycles.

As noted, load cells 114 and/or 118 can be provided with the system 30. The control signals provided by the load cells can be integrated into the control function. For example, one use of the load cell or cells can be to detect the presence of beverage in the funnel 42 or carafe 46. This information can be used to relay information to the indicator 114 or display 110. Such indications can include "brew done" or "brew not done". For example, it can beneficial to warn the user that the brew is not done so that they know to leave the carafe or cup in a position to receive beverage 44. Premature removal of the container 46 can result in spilling of beverage 44. Similarly, using the load cell or cells to detect the presence of fluid in the funnel 42 and/or container 46 can indicate that the brew is done. While an exact weight is not required, monitoring the rate of change in the weight can provide an indication as to the condition or status of the fluid moving through the funnel or contained in the container 46. In this regard, when the rate of change of fluid is detected to be approaching zero this could be an indicator that the fluid has moved through the funnel 42 into the container and has essentially ceased flowing from the funnel 42. This would provide an indication via the controller 64 that the container 46 can be removed for consumption or dispensing. Detection of the rate of change characteristic can be useful to more consistently and accurately detect that the "drip out" is completed. Prior art systems which might have used optical detectors or other means to detect drip out are subject to error as a result of obstruction of the flow from the funnel as well as obstruction of the sensing device which relied on the detection of the actual presence or absence of fluid passing the detection device.

The load cell can also be used to detect when the system 30 is ready for brewing. In this regard, a load cell 104 associated with the funnel can detect the presence or absence of beverage making substance in the funnel. In other words, the funnel without the substance would have a tare weight which could be calibrated for the system. Any weight above the tare weight would indicate that the brewing substance was already placed in the funnel thereby satisfying another condition for brewing. Of course, the tare weight could be calibrated to accommodate a filter such that the combined funnel and filter 150 would be the resultant tare weight.

Similarly, the load cell 118 provided under the base of the container 46 either at a heated station or an unheated station could detect the presence or absence of a container. Additionally, depending on the type of sensor used the sensor could accommodate the detection of the volume of the container. For example, if a large glass carafe is used for the container 46 this would indicate that a large volume could be dispensed into that carafe. Alternatively, if a light paper cup is used this would indicate to the system that only a much smaller volume of coffee could be dispensed into the cup. A cup stand could be provided to position the shorter cup relatively closer to the funnel 42 to reduce splashing. This could be a detection and reporting option during the brew start up cycle to detect the smaller cup and then suggest to the user that a cup stand might be recommended.

If the load cell 118 is used with a heating stand or warming plate the load cell can be used as an on or off switch to cease heating of the plate when the container 46 is not detected by the load cell 118. Once again, the absence of a container 46 detected by the load cell 118 can be used as a control signal to prevent the dispensing of water through the system so as to prevent unintended dispensing of beverage without a container 46 to receive it. An additional possible use for the load cell in the funnel is to manage overflow conditions which could result in beverage flowing over the top of the funnel instead of out through the dispensing drain 152. If the rate of change exceeds a predetermined threshold value it might be used to indicate that an overflow condition could result. This could occur by the unintentional use of two filter papers, soft water, decaf coffee, unreasonably finely ground coffee as well as other circumstances. If an overflow condition is detected, the controller 64 can cease operation of the pump thereby preventing or minimizing the amount of fluid dispensed to the funnel under such circumstances. As an alternative, the system could go into "pulse routine mode" to extend the time during which water is dispensed and facilitate drainage of beverage from the funnel 42. This would still result in completing the brew cycle and producing a beverage which might be valuable under some serving circumstances but also prevent creating a mess at the beverage maker. By using the available sensor information and controls the controller 64 can display to the user at the interface 110 that these conditions were encountered and that the user needs to address the system for future brews. This also alerts the user to the potential for a different flavor to the coffee as the result of extending brewing times, changing pulse routines, or otherwise altering a predetermined recipe that might have been programmed for the type of brewing substance. This allows the system 30 to have some degree of intelligence to provide feedback to the user instead of the user merely being frustrated and complaining that their machine is "broken". The trouble may have been an operator error as opposed to an equipment error.

As noted, different sizes of container 46 may be used. In this regard, an insert may be added to the funnel 42 to accommodate a smaller brewing substance 40 volume. In this regard, if a single cup or a large travel mug is used a smaller quantity of brewing substance is preferred compared to using an entire funnel of brewing substance. Also, the use of an insert 160 helps to maintain a preferred depth of brewing substance within the brewing area. This "bed depth" helps to maintain desirable brewing characteristics. Additionally, the use of the pump 50 to control the spray head pattern can be also used to control the pattern used with the insert 160. In other words, the insert 160 is expected to have a smaller diameter than the funnel 42. As such, a different spray pattern may be desirable to produce a consistent brewed beverage flavor and set of characteristics.

Figure 2:
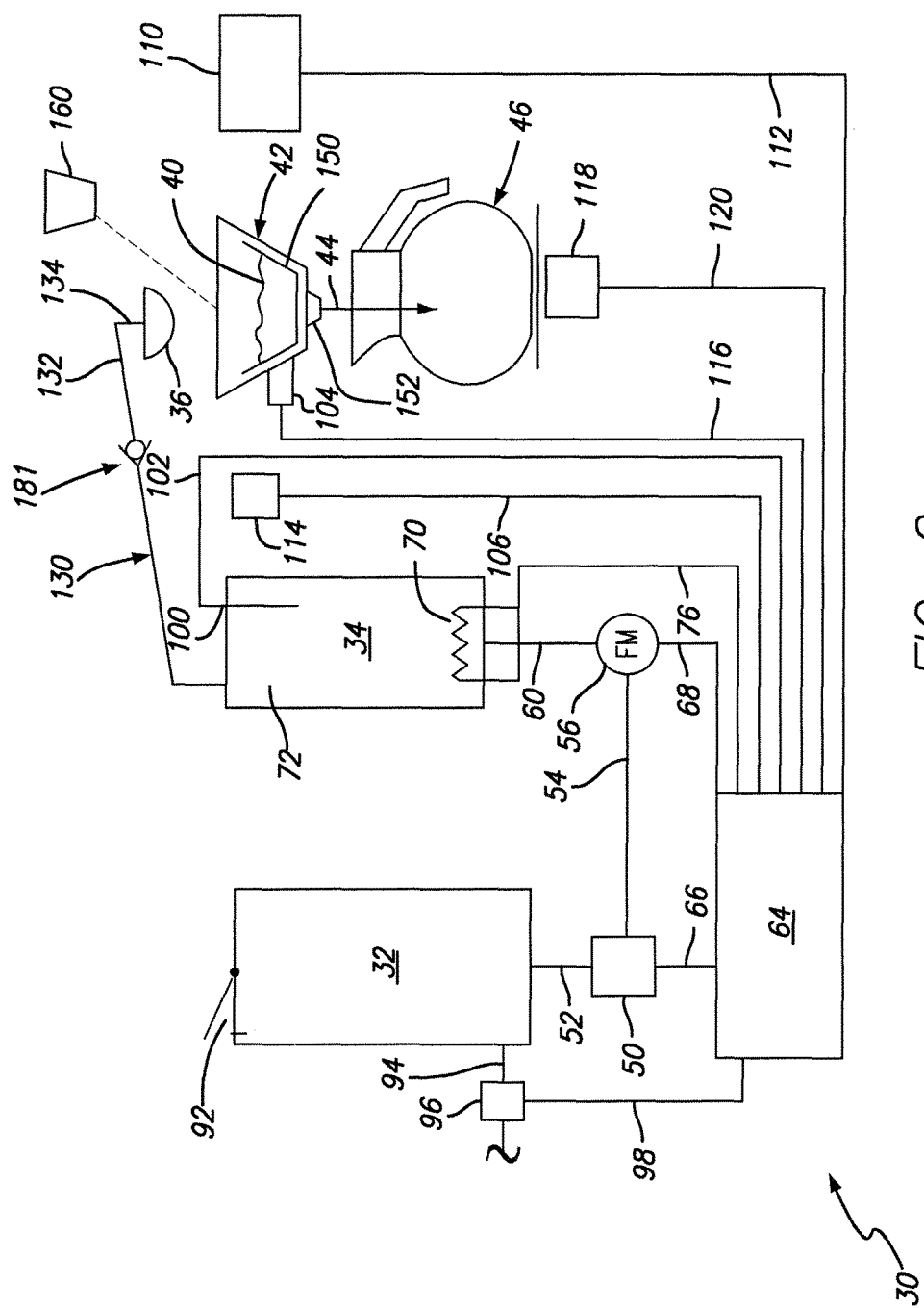
FIG. 2 shows alternate configurations of the system in FIG. 1, FIG. 2 eliminates the need for a controllable vent valve (item 80 in FIG. 1) and moves the check valve (item 58 in FIG. 1) to the line 130 between the hot tank and the spray head. This is potentially a more cost effective and simpler system to achieve the desired results.

FIG. 2 shows a system configuration similar to FIG. 1, but with the removal of the valve 80, and the line 90 to the controller 64, as well as the fluid connection lines 82 and 84. The check valve 58 was also removed, and is in fact inserted as item 181 in the spray head line 130. Line 130 still slopes upward, but the check valve 181 will provide a pressure drop "bias" such that as the hot tank 34 reheats to target temperature, any expanding water is directed through line 54 back to the reservoir 32. In this way, the expansion water will not exit the spray head 36. This configuration is lower cost and somewhat simpler to control as it eliminates the control valve 80.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A beverage making apparatus for combining water with a beverage brewing substance to create a brewed beverage, the apparatus comprising:

a reservoir for receiving water;

a heated water tank for receiving the water from the reservoir and heating the water for use in a brewing cycle;

a spray head communicating with the heated water tank for receiving the water from the heated water tank and distributing it;

a dispensing line communicating with an upper portion of the heated water tank and the spray head providing an unrestricted flow path from the heated water tank to the spray head;

a substance retaining funnel cooperatively associated with the apparatus for retaining a filter and brewing substance therein and receiving the water from the spray head for combination therewith to produce the brewed beverage;

a controllable pump directly communicating with the reservoir and with the heated water tank providing the only device for controllably moving and stopping the water from the reservoir to the heated water tank for delivery through the spray head and to the substance retaining funnel;

a flow meter communicating with the pump and the heated water tank to detect the flow of water from the reservoir to the heated water tank;

a controller coupled to at least the controllable pump for controllably operating the controllable pump to control the dispensing of the water from the spray head over the brewing substance in the substance retaining funnel; and the controllable pump being operable to alter a water distribution pattern of the water dispensed by the spray head by increasing a pressure of the water flowing from the spray head to expand the spray pattern and to decrease the pressure to the spray head to contract a spray pattern.

2. The apparatus of claim 1, further comprising:

the controllable pump being controllable to produce an increased pressure in the heated water tank to expand the water distribution pattern of the water dispensed by the spray head, the funnel including a passage position between the filter retained within the substance retaining funnel and a substance retaining funnel side wall to receive the water there through, the spray pattern being controlled by the controllable pump to transfer the water from the spray head outwardly to a space between the filter and the substance retaining funnel wall to permit by by-pass of the water which does not significantly flow through the beverage making substance retained within the filter in the substance retaining funnel.

3. The apparatus of claim 1, further comprising:

a controllable valve communicating with an upper portion of the heated water tank and with the reservoir to permit transfer of the water from the heated water tank to the reservoir when the controllable valve is controllably operated into an open position, the controllable valve being in a normally closed position.

4. A method for producing a brewed beverage comprising the steps of:

providing a reservoir for receiving water;

depositing the water into the reservoir;

providing a heated water tank;

controllably transferring the water from the reservoir to the heated water tank for heating the water for use in a brewing cycle;

providing a spray head communicating with the heated water tank;

transferring the water from the heated water tank to the spray head;

providing a substance retaining funnel cooperatively associated with the apparatus for retaining brewing substance in a filter therein and receiving the water from the spray head for combination therewith to produce a brewed beverage;

providing a controllable pump directly communicating with the reservoir as the only device for controllably moving and stopping the water from the reservoir to the heated water tank;

using the controllable pump to move the water from the reservoir to the tank in a controlled manner for delivery through the spray head and to the funnel;

providing a dispensing line communicating with an upper portion of the heated water tank and the spray head for providing an unrestricted flow path from the heated water tank to the spray head;

providing a flow meter communicating with the pump and the heated water tank to detect the flow of water from the reservoir to the heated water tank;

providing a controller coupled to at least the controllable pump;

controllably operating the controllable pump to dispense water from the spray head over the brewing substance in the substance retaining funnel; and controllably altering a water distribution pattern of the water dispensed by the spray head by increasing a pressure of the water flowing from the spray head to expand the spray pattern and to decrease the pressure to the spray head to contract a spray pattern.

* * * * *